(12) United States Patent  (10) Patent No.: US 9,074,944 B2
Bruce  (45) Date of Patent: Jul. 7, 2015

(54) GRILL BUDDIES

(71) Applicant: Joseph Bruce, Petersburg, VA (US)

(72) Inventor: Joseph Bruce, Petersburg, VA (US)

( * ) Notice: Subject to any disclaimer, the term of this patent is extended or adjusted under 35 U.S.C. 154(b) by 308 days.

(21) Appl. No.: 13/740,644

(22) Filed: Jan. 14, 2013

(65) Prior Publication Data

US 2013/0199436 A1 Aug. 8, 2013

Related U.S. Application Data

(60) Provisional application No. 61/593,977, filed on Feb. 2, 2012.

(51) Int. Cl.
  *G01K 1/02* (2006.01)
  *G01K 11/06* (2006.01)

(52) U.S. Cl.
  CPC ........ *G01K 1/02* (2013.01); *G01K 11/06* (2013.01); *G01K 2207/06* (2013.01)

(58) Field of Classification Search
  CPC ......... G01K 1/02; G01K 11/00; G01K 13/00; G01K 11/06; G01K 2207/06
  USPC .......... 116/216, 217, 218; 374/104, 106, 155, 374/159, 160; 40/637, 645, 661.11
  See application file for complete search history.

(56) References Cited

U.S. PATENT DOCUMENTS

| | | | | |
|---|---|---|---|---|
| 1,888,368 | A * | 11/1932 | Allen | 40/310 |
| 3,323,239 | A * | 6/1967 | Nelson | 40/637 |
| 3,479,876 | A * | 11/1969 | Kliewer | 374/104 |
| 3,527,098 | A * | 9/1970 | Salgado et al. | 374/104 |
| 3,759,103 | A * | 9/1973 | Volk | 374/160 |
| 4,141,239 | A * | 2/1979 | Gilbert | 73/81 |
| 4,356,790 | A | 11/1982 | Gee | |
| 4,390,291 | A * | 6/1983 | Gaven et al. | 374/160 |
| 4,421,053 | A | 12/1983 | volk | |
| 5,010,670 | A * | 4/1991 | Minervini | 40/593 |
| 5,323,730 | A | 6/1994 | Ou-Yang | |
| 5,531,180 | A * | 7/1996 | Bianchini | 116/216 |
| 5,537,950 | A | 7/1996 | Ou-Yang | |
| 5,712,466 | A | 1/1998 | Spicer | |
| 5,893,155 | A | 4/1999 | Cheriton | |
| 5,988,102 | A | 11/1999 | Volk et al. | |
| 5,992,302 | A | 11/1999 | Geisler | |
| 6,176,197 | B1 | 1/2001 | Thompson | |
| 6,289,794 | B1 | 9/2001 | Carmon | |
| 6,403,131 | B1 | 6/2002 | Carmon | |
| D644,869 | S * | 9/2011 | Borovicka et al. | D7/387 |
| 8,471,716 | B2 * | 6/2013 | Hansen | 340/604 |
| 8,601,728 | B2 * | 12/2013 | Philipps | 40/312 |
| 2004/0074398 | A1 | 4/2004 | Griffin et al. | |
| 2008/0145484 | A1 * | 6/2008 | Haywood | 426/87 |

* cited by examiner

*Primary Examiner* — R. A. Smith
(74) *Attorney, Agent, or Firm* — Buckingham, Doolittle & Burroughs, LLC

(57) ABSTRACT

A thermal indicator device is disclosed for providing an indication that an article of food is heated to a certain level of preparedness. The thermal indicator device comprises a stake and a marker secured to the stake. The stake comprises an end adapted for insertion into the food. The marker is adapted for movement between a retracted position and an extended position. The marker is retained in the retracted position via a string, and actuated to the extended position via an internal spring. Accordingly, at a temperature below the melting temperature, the string maintains the marker in the retracted position, and when the internal temperature of the food rises to a temperature equal to or higher than the melting temperature, the string melts to permit release of the marker into the extended position. Once the string melts, the internal spring actuates the marker into the extended position for visual indication.

10 Claims, 5 Drawing Sheets

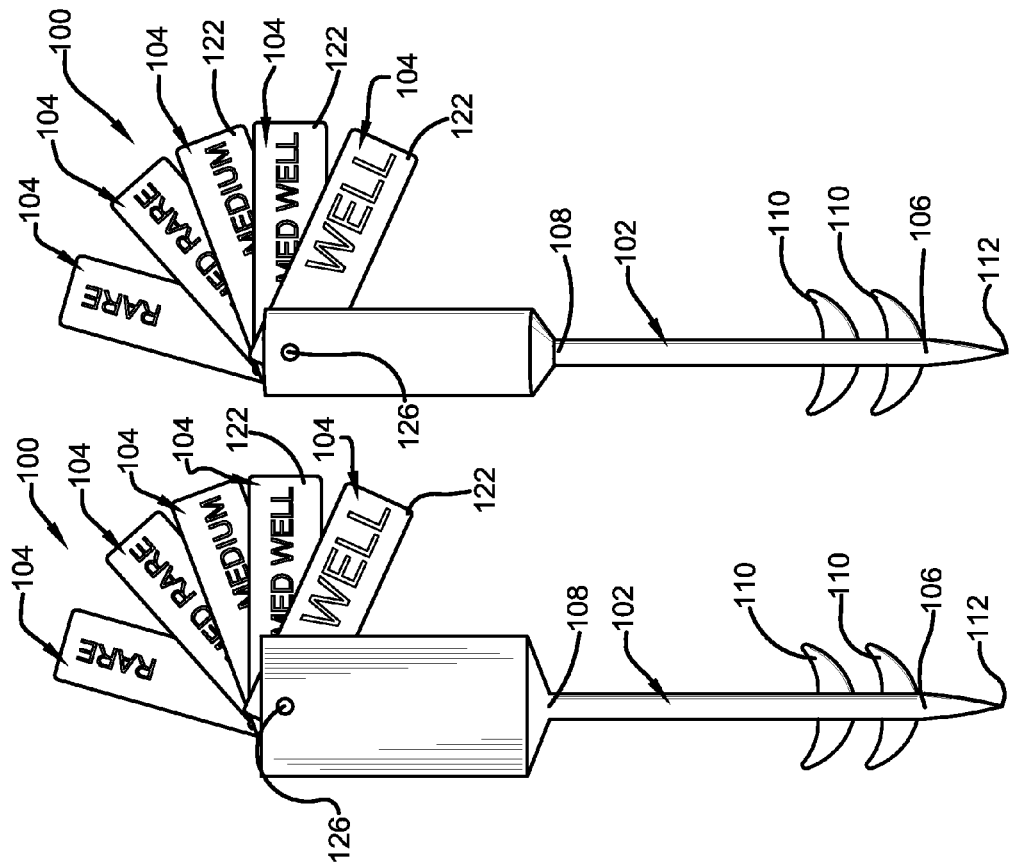
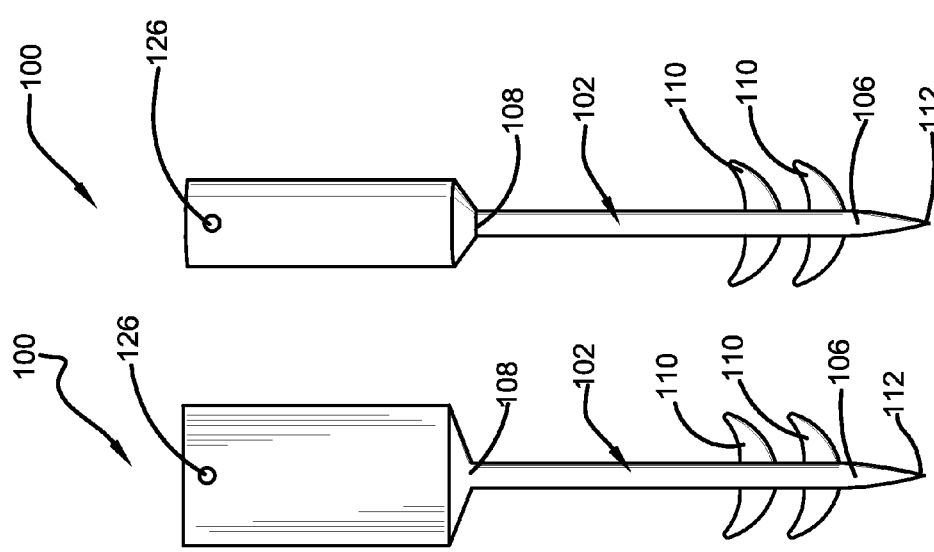
FIG. 1A
FIG. 1B

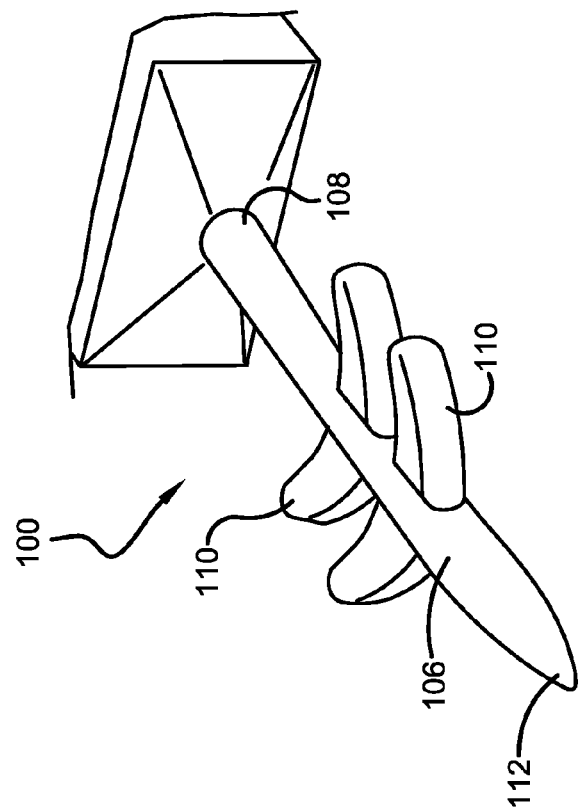
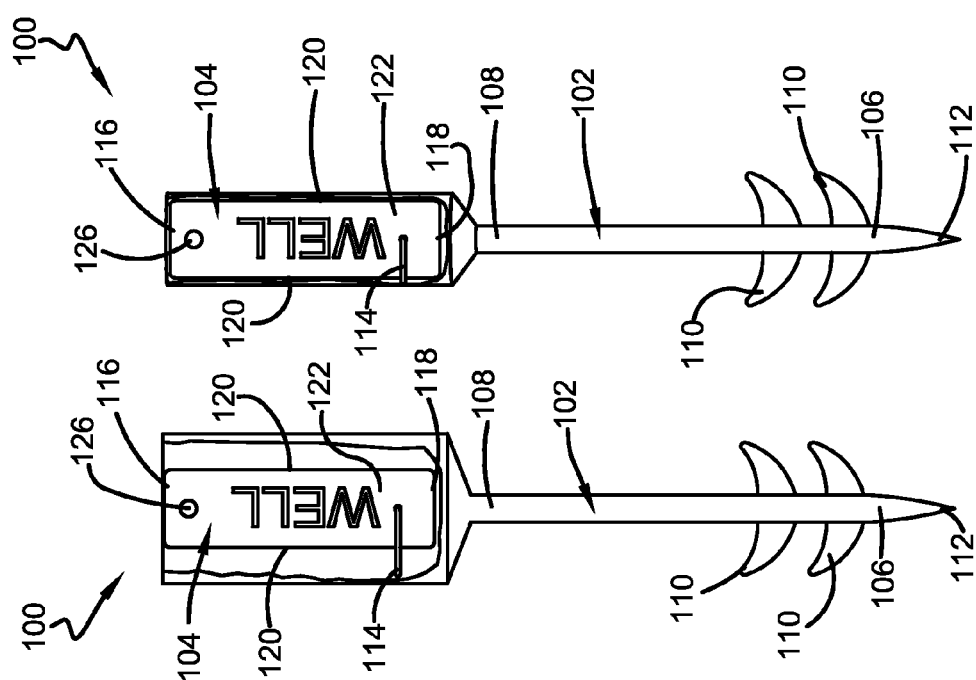

GRILL BUDDIES

CROSS-REFERENCE

This application claims priority from Provisional Patent Application Ser. No. 61/593,977 filed Feb. 2, 2012.

BACKGROUND

Grilling a steak to the perfect level of preparedness can be a difficult game of guesswork. Specifically, it can be difficult to tell if the meat or other food item is being cooked at the correct temperature, and whether the food item is rare, medium rare, medium, medium well, or well-done. To check, the griller may frequently cut into the steak or other food item, which release juices drying the food item out. This can lead to a tough and un-enjoyable tasting steak making guests unhappy. Further, the griller may lose track of time and accidentally burn the steaks or other food items because he/she didn't know when to take them off the grill. When cooking for a large group of people, all of whom want their steak or other food item prepared at a different level, it can be difficult to make sure every individual order is cooked to the desired level of preparedness. A system for easily and immediately recognizing when a steak or other food item is at a certain level of preparedness during cooking is necessary.

There is a need for a thermal indicator device that can indicate a food item's level of preparedness while cooking. The present invention allows grillers to produce a perfectly prepared steak or other food item every time, catered to the personal preference of each individual. This invention allows a griller to automatically know when the steak or other food item is rare, medium rare, medium, medium well, and well-done without having to cut into the steak or other food item to check. This helps keep necessary juices in the steak or other food item, which makes the food taste better and keeps it from drying out and getting tough. The thermal indicator device automatically releases markers to signify the level to which the steak or other food item is prepared, alerting the griller immediately without having to guess. The thermal indicator device can also be used with a broiler, oven, and/or smoker. For individuals preparing multiple steaks or other food items for guests with varied preparedness preferences, this invention makes it easy to keep track of which stage of preparation the food is in, ensuring everyone's meal is to their satisfaction.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a thermal indicator device for providing an indication that an article of food is cooked to a certain level of preparedness. The thermal indicator device comprises a stake, and at least one marker movably secured to the stake. The stake comprises a first end and a second end, wherein the first end is adapted for insertion into the article of food to be cooked and typically comprises a barbed pointed tip. The marker is movably secured to the second end of the stake and is adapted for movement between a retracted position and an extended position. Specifically, the marker is retained within the hollow stake in the retracted position via an internal string, and actuated to the extended position via an internal spring. Accordingly, at a temperature below the specific melting temperature, the string maintains the marker in the retracted position, and when the internal temperature of the article of food rises to a temperature equal to or higher than the specific melting temperature, the string melts to permit release of the marker into the extended position. Thus, once the string melts, the internal spring actuates the marker and flips it up into the extended position for visual indication.

In a preferred embodiment, the thermal indicator device comprises up to five markers which are typically labeled on their surface with a particular level of preparedness, such as but not limited to, rare, medium rare, medium, medium well, and well-done. Each marker would have a separate string attached to it, and each string would have a specific melting temperature, different from the other marker strings.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 1A illustrates a front perspective view of the thermal indicator device with the markers in a retracted position in accordance with the disclosed architecture.

FIG. 1B illustrates a front perspective view of the thermal indicator device with the markers in an extended position in accordance with the disclosed architecture.

FIG. 2A illustrates a front perspective view of the interior of the thermal indicator device disclosing the internal strings in accordance with the disclosed architecture.

FIG. 2B illustrates a bottom perspective view of the thermal indicator device with a barbed tip in accordance with the disclosed architecture.

DESCRIPTION OF PREFERRED EMBODIMENTS

Figure 3:
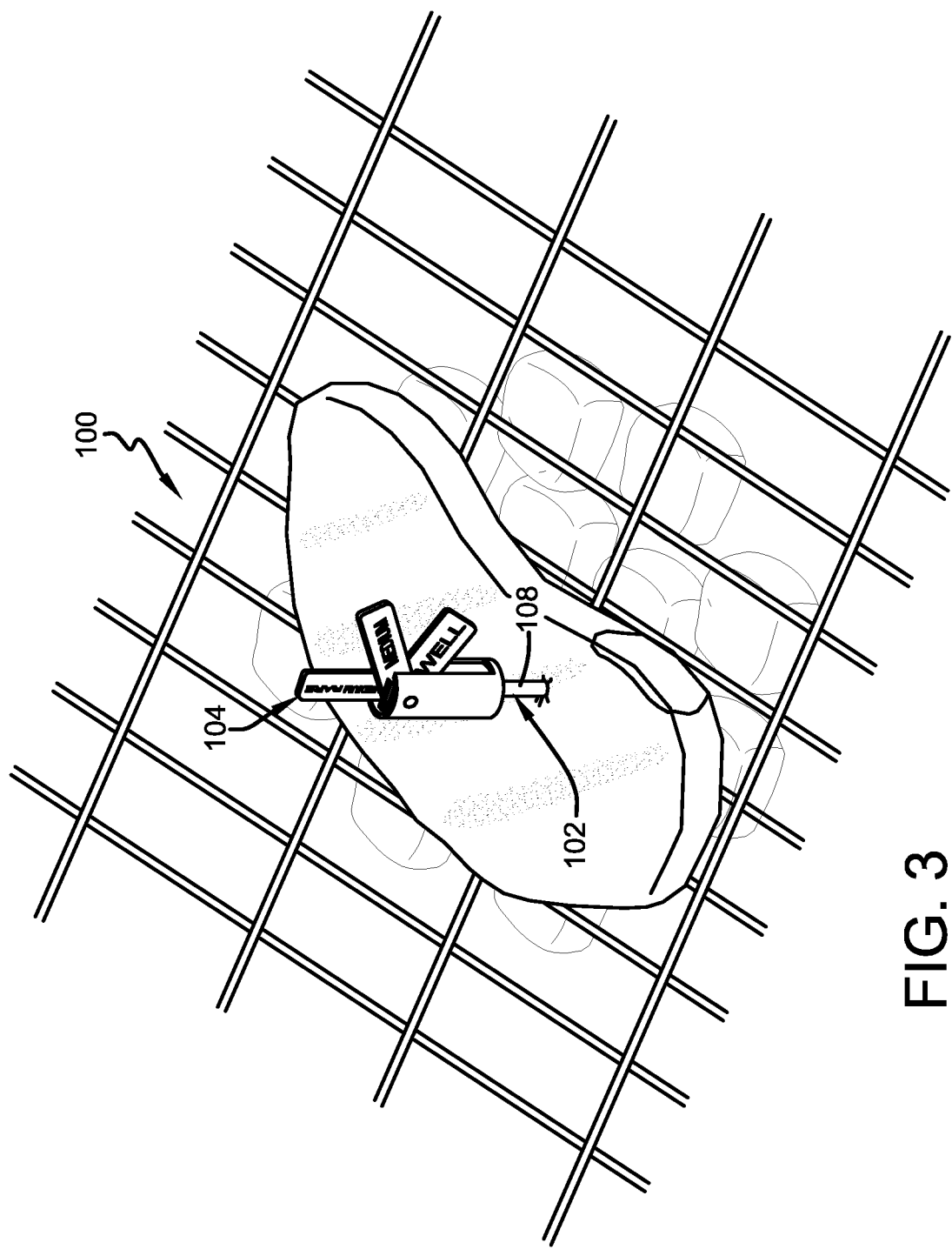
FIG. 3 illustrates a perspective view of the thermal indicator device in use with the markers flipping up in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a thermal indicator device that can indicate a food item's level of preparedness while cooking. The present invention allows grillers to produce a perfectly prepared steak or other food item every time, catered to the personal preference of each individual. Upon achieving a certain internal temperature, the thermal indicator device automatically releases markers to signify the level to which the steak or other food item is prepared, alerting the griller immediately without having to guess as to the level of preparedness of the food item and without having to cut into the food item. For individuals preparing multiple steaks or other food items for guests with varied preparedness preferences, this invention makes it easy to keep track of which stage of preparation the food is in, ensuring everyone's meal is to their satisfaction. Further, the thermal indicator device can be a single use, disposable device or a multi-use device, depending on the wants and needs of a user.

The thermal indicator device comprises a stake and a marker secured to the stake. The stake comprises an end adapted for insertion into the food. The marker is adapted for movement between a retracted position and an extended position. The marker is retained in the retracted position via a string, and actuated to the extended position via an internal spring when the string is broken. Accordingly, at a temperature below the melting temperature, the string maintains the marker in the retracted position, and when the internal temperature of the food rises to a temperature equal to or higher than the melting temperature of the string, the string melts to permit release of the marker into the extended position. Once the string melts, the internal spring actuates the marker into the extended position via the biased internal spring, which in turn notifies the preparer that the food has achieved a particular level of preparedness.

Referring initially to the drawings, FIGS. 1A-B and 2A-B illustrate the thermal indicator device 100 for providing an indication that an article of food is cooked to a certain level of preparedness. The thermal indicator device 100 comprises a stake (or post) 102, and at least one marker 104 movably secured to the stake 102. The stake 102 comprises a first end 106 and a second end 108, wherein the first end 106 is adapted for insertion into the article of food to be heated. Typically, the stake 102 is cylindrical or rectangular in shape, however any other suitable shape can be used as is known in the art without affecting the overall concept of the invention.

The stake 102 would generally be constructed of plastic, wood, and/or a wood finish, etc., though any other suitable material may be used to manufacture the stake 102 as is known in the art without affecting the overall concept of the invention. The stake 102 can also comprise a variety of colors and designs to suit user preference. The stake 102 is approximately between 1.5 and 2.0 inches long as measured from the first end 106 to the second end 108, and approximately between 0.50 and 0.75 inches in width or diameter.

Typically, the stake 102 is hollow (see FIG. 2B), but it does not have to be and can function by being partly solid. Additionally, if not completely hollow, the interior of the stake 102 can comprise at least one opening (not shown) for allowing the thermal indicator device 100 to receive air once the stake 102 is inserted into the food item, if necessary. In a preferred embodiment, the interior of the stake 102 would comprise up to five openings for receiving air, however the stake 102 can comprise any suitable number of openings as is known in the art without affecting the overall concept of the invention. For example, the stake 102 could have one opening for all five of the markers.

Further, the stake 102 can comprise a barbed 110 (or pronged) pointed tip 112 located on its first end 106. Specifically, the first end 106 is adapted for insertion into the article of food to be heated and is typically shaped into a point 112 or other suitable shape for piercing articles of food. Further, the first end 106 of the stake 102 may comprise barbs 110 on its tip, or any other suitable item for helping the first end 106 of the stake 102 to stick into (or be retained in) the article of food. Once the first end 106 of the stake 102 is inserted into the article of food, the barbs 110 contact the food and act to retain the stake 102 upright in a vertical position, in the food.

The thermal indicator device 100 further comprises at least one marker 104 movably secured to the second end 108 of the stake 102 and adapted for movement between a retracted position and an extended position. Typically, the thermal indicator device 100 comprises up to five markers 104, however any number of suitable markers 104 can be used as is known in the art without affecting the overall concept of the invention. Further, markers 104 are typically labeled on their surface 122 with each individual marker 104 signifying a different level of preparedness, such as but not limited to, rare, medium rare, medium, medium well, and well-done.

Additionally, the markers 104 are movably secured to the second end 108 of the stake 102 via any suitable securing means as is known in the art, such as a pin 126, a joint, etc. The markers 104 are adapted for pivotable movement between a retracted position (shown in FIG. 1A) and an extended position (shown in FIG. 1B). Specifically, the markers 104 are retained within the hollow stake 102 in the retracted position via an internal string 114, or any other suitable securing means as is known in the art. Each individual marker 104 would have an individual string 114 secured to it.

The markers 104 would also be actuated to the extended position via a biased internal spring (not shown). Specifically, the internal spring would be attached to the stake 102 causing the markers 104 to be loaded with spring tension when folded down in the retracted position. Once the string 114 is melted to release the markers 104, the internal spring actuates the markers 104 to swing up to an extended position, displaying the specific level of food preparedness for visual indication.

The string 114 would generally be constructed of plastic or nylon or any other suitable melt-able material as is known in the art. As the article of food heats up, the internal temperature rises which melts the string 114 at a specific melting temperature, releasing the marker 104 to signify at what temperature level the article of food is currently cooked at. As stated supra, each marker 104 would have an individual (or separate) string 114 attached to it, and each string 114 would have a specific melting temperature, different from the other marker strings. The weights of the strings 114 would typically be thicker or thinner depending on the cook temperatures the strings 114 represent, such that the thicker the weight of the string 114, the higher the melting temperature associated with the string 114, and the thinner the weight of the string 114, the lower the melting temperature associated with the string 114.

For example, the melting temperature of the string connected to the 'rare' marker is between 125 degrees Celsius and 130 degrees Celsius. The melting temperature of the string connected to the 'medium rare' marker is between 130 degrees Celsius and 135 degrees Celsius. The melting temperature of the string connected to the 'medium' marker is between 140 degrees Celsius and 145 degrees Celsius. The melting temperature of the string connected to the 'medium well' marker is between 155 degrees Celsius and 160 degrees Celsius. The melting temperature of the string connected to the 'well-done' marker is between 170 degrees Celsius and 180 degrees Celsius.

Accordingly, at a temperature below the specific melting temperature, the string 114 maintains the marker 104 in the retracted position, and when the internal temperature of the article of food rises to a temperature equal to or higher than the specific melting temperature, the string 114 melts to permit release of the marker 104 into the extended position. Thus, once the string 114 melts, the internal spring actuates the marker 104 and flips it up into the extended position for visual indication.

Further, the markers 104 would generally be constructed of the same materials as the stake 102, such as plastic, wood, and/or a wood finish, etc., though any other suitable material may be used to manufacture the markers 104 as is known in the art without affecting the overall concept of the invention. The markers 104 can also comprise a variety of colors and designs to suit user preference. The markers 104 are approximately between 0.75 and 1.0 inches long as measured from the first end 116 to the second end 118, and approximately between 0.50 and 0.75 inches wide as measured from opposing sides 120. The markers 104 are sized to be stored within the stake 102, and up to five markers 104 can be stored at the same time within the stake 102 without touching.

FIG. 3 illustrates the thermal indicator device 100 in use with the markers 104 flipping up for visual indication. As stated supra, the markers 104 are movably secured to the second end 108 of the stake 102 via any suitable securing means as is known in the art, such as a pin, a joint, etc. The markers 104 are adapted for pivotable movement between a retracted position and an extended position. Specifically, the markers 104 are retained within the hollow stake 102 in the retracted position via an internal string, or any other suitable securing means as is known in the art.

The string would generally be constructed of plastic or nylon or any other suitable melt-able material as is known in the art. As the article of food heats up, the internal temperature rises which melts the string, releasing the marker 104 to signify at what temperature level the article of food is currently cooked at. Any suitable number of markers 104 can be used, and each individual marker 104 would have a separate string attached to it, with each string having a specific melting temperature, different from the other marker strings. The weights of the strings would typically be thicker or thinner depending on the cook temperatures the strings represent, such that the thicker the weight of the string, the higher the melting temperature associated with the string, and the thinner the weight of the string, the lower the melting temperature associated with the string.

For example, the melting temperature of the string connected to the 'rare' marker is between 125 degrees Celsius and 130 degrees Celsius. The melting temperature of the string connected to the 'medium rare' marker is between 130 degrees Celsius and 135 degrees Celsius. The melting temperature of the string connected to the 'medium' marker is between 140 degrees Celsius and 145 degrees Celsius. The melting temperature of the string connected to the 'medium well' marker is between 155 degrees Celsius and 160 degrees Celsius. The melting temperature of the string connected to the 'well-done' marker is between 170 degrees Celsius and 180 degrees Celsius.

Further, the markers 104 would be actuated to the extended position (i.e., flipped up) via an internal spring (not shown). Specifically, the internal spring would be attached to the stake 102 causing the markers 104 to be loaded with spring tension when folded down in the retracted position. Once the string is melted to release the markers 104, the internal spring actuates the markers 104 to swing up to an extended position, displaying the specific cook temperature for visual indication.

Accordingly, at a temperature below the specific melting temperature of the string, the string maintains the marker 104 in the retracted position, and when the internal temperature of the article of food rises to a temperature equal to or higher than the specific melting temperature, the string melts to permit release of the marker 104 into the extended position. Thus, once the string melts, the internal spring actuates the marker 104 and flips it up into the extended position for visual indication.

Figure 4:
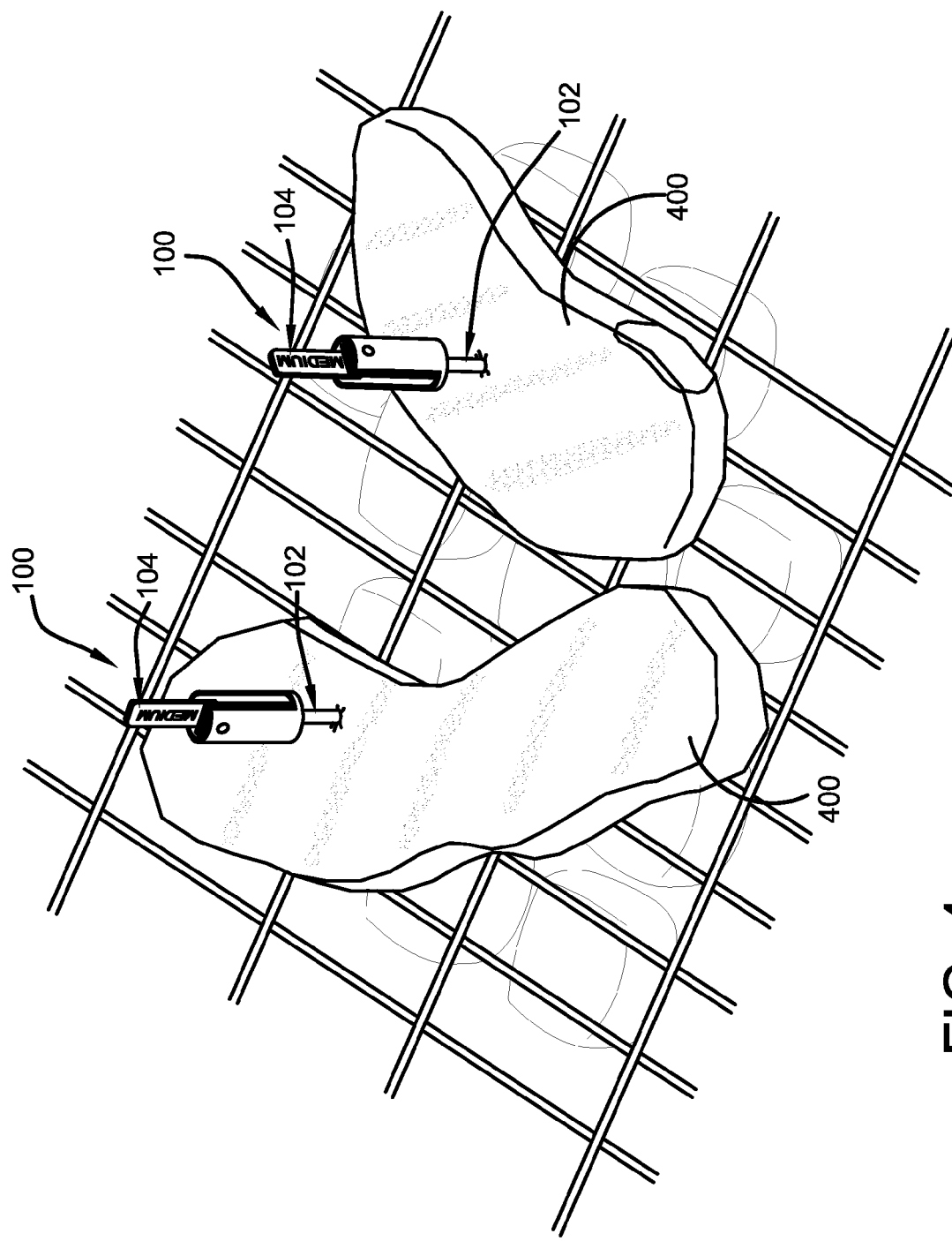
FIG. 4 illustrates a perspective view of the thermal indicator device in use during grilling in accordance with the disclosed architecture.
Figure 5:
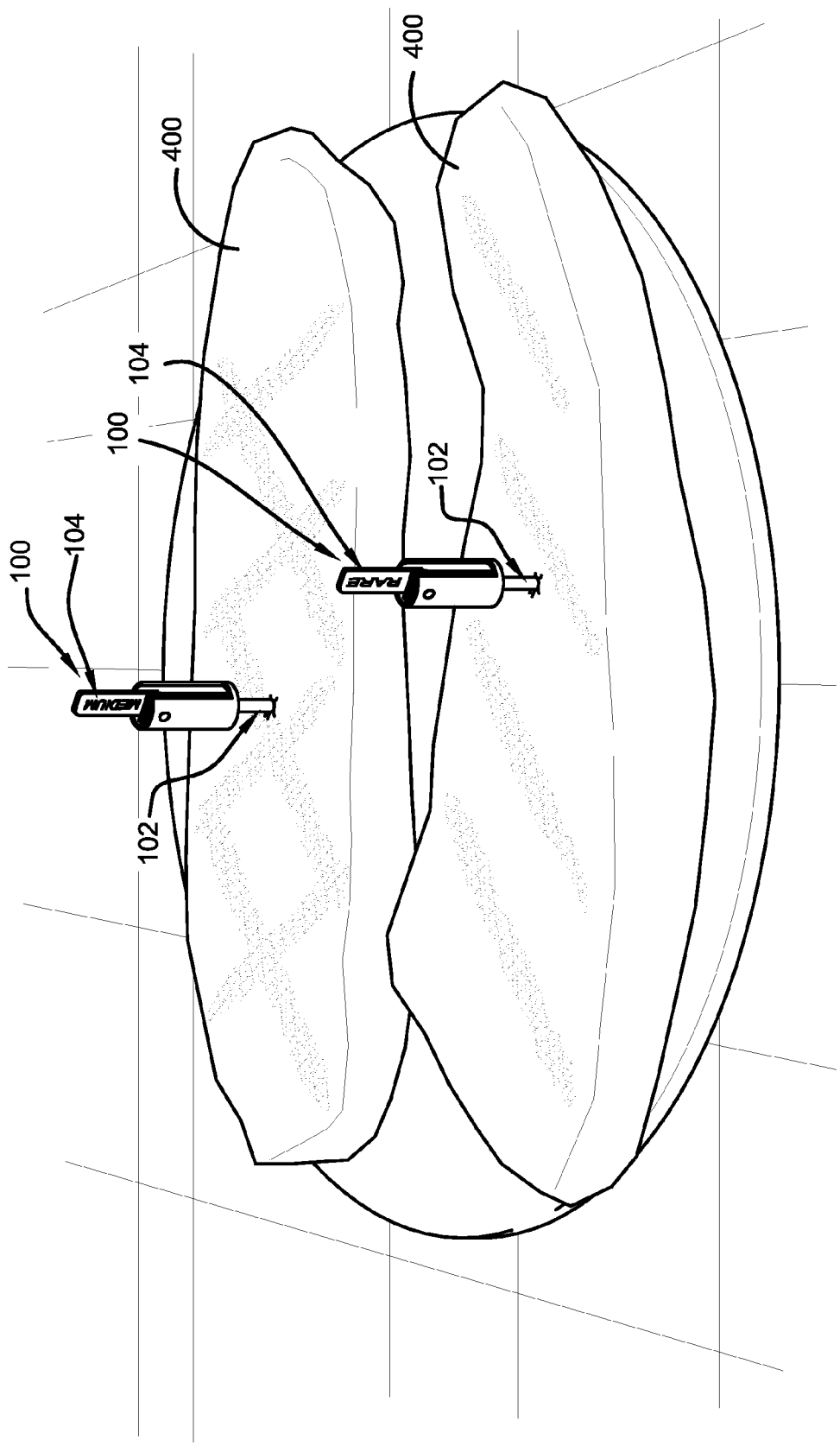
FIG. 5 illustrates a perspective view of the thermal indicator device in use in accordance with the disclosed architecture.

FIGS. 4-5 illustrate the thermal indicator device 100 in use. Specifically, FIG. 4 illustrates the thermal indicator device 100 in use while grilling and FIG. 5 illustrates the thermal indicator device 100 in use after grilling. In operation, a user (not shown) would choose the color and/or specific design of the thermal indicator device 100 that meets their needs and/or wants. The user would also choose a thermal indicator device 100 comprising the number of markers 104 that meets their needs and/or wants, and which is labeled with the desired cook temperatures (i.e., rare, medium, medium well, etc.). The user would then manually insert the thermal indicator device 100 into the article of food 400 to be cooked, grilled, etc. The thermal indicator device 100 would be inserted into the food 400 via inserting the barbed, pointed tip into the article of food 400 to be heated. Once the barbed end of the stake 102 is inserted into the article of food 400, the barbs contact the food 400 and act to retain the stake 102 upright in a vertical position, in the food 400. Typically, the thermal indicator device 100 is only inserted into the food 400 once it has been flipped over during the grilling process. The user would grill the food 400 to a desired texture and color, and then flip the food 400 over and insert the thermal indicator device 100 into the food 400 to determine when the desired internal temperature has been reached without having to cut into the food 400 to find out.

Once in position, a user then continues to cook, grill, etc. the food 400 as normally done. As the food 400 increase in heat and the internal temperature rises, the strings that retain the markers 104 of the thermal indicator device 100 in a retracted position melt, releasing the markers 104 which flip up to reveal at what temperature level the article of food 400 is currently cooked at. Accordingly, at a temperature below the specific melting temperature of the string, the string maintains the marker 104 in the retracted position, and when the internal temperature of the article of food rises to a temperature equal to or higher than the specific melting temperature, the string melts to permit release of the marker 104 into the extended position. Thus, once the string melts, the internal spring actuates the marker 104 and flips it up into the extended position for visual indication. Accordingly, the thermal indicator device 100 allows grillers and cooks to automatically know when the article of food 400 is rare, medium rare, medium, medium well, or well-done without cutting into the food 400 to check. This helps keep necessary juices in the steak or other food item, which makes the food taste better and keeps it from drying out and getting tough.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A thermal indicator device for providing an indication that an article of food is cooked to a predetermined level of preparedness, comprising:
- a hollow stake comprising a first end and a second end; wherein the first end is adapted for insertion into the article of food to be heated; and
- at least one marker movably secured to the second end of the hollow stake and adapted for movement between a retracted position and an extended position, wherein the at least one marker is retained within the hollow stake in the retracted position via a string comprised of plastic or nylon and further wherein the at least one marker is actuated to the extended position via an internal spring, and further wherein at a temperature below a predetermined melting temperature of the string, the string maintains the at least one marker in the retracted position, and when at a temperature equal to or higher than the predetermined melting temperature of the string, the string melts to permit release of the at least one marker into the extended position, and once the string melts, the internal spring actuates the at least one marker into the extended position for visual indication.

2. The thermal indicator device of claim 1, wherein the melting temperature of the string is between 125 degrees Celsius and 130 degrees Celsius.

3. A thermal indicator device for providing an indication that an article of food is cooked to a predetermined level of preparedness, comprising:
- a hollow stake comprising a first end and a second end, wherein the first end is adapted for insertion into the article of food to be heated;
- at least five markers, wherein each of said at least five markers is movably secured to the second end of the hollow stake and adapted for movement between a retracted position and an extended position, and further wherein each of said at least five markers are labelled as either rare, medium rare, medium, medium well, and well-done; and
- at least five strings, wherein each of said at least five markers is retained within the hollow stake in the retracted position via one of said at least five strings and further wherein each of said at least five strings comprises a different melting temperature.

4. The thermal indicator device of claim 3 wherein at a temperature below a predetermined melting temperature of one of said at least five strings, said one of at least five strings maintains at least one of said at least five markers in the retracted position, and when at a temperature equal to or higher than the predetermined melting temperature of said one of said at least five strings, said one of said at least five strings melts to permit release of said at least one of said at least five markers into the extended position for visual indication.

5. The thermal indicator device of claim 4, wherein each of said at least five strings is comprised of plastic or nylon.

6. The thermal indicator device of claim 5, wherein the melting temperature of at least one of said at least five strings is between 170 degrees Celsius and 180 degrees Celsius.

7. A thermal indicator device for providing an indication that an article of food is cooked to a predetermined level of preparedness comprising:
- a hollow stake comprising a first end and a second end, wherein the first end is adapted for insertion into the article of food to be heated;
- at least one marker movably secured to the second end of the hollow stake and adapted for movement between a retracted position and an extended position; and
- a corresponding string for each of said at least one marker, wherein the at least one marker is retained within the hollow stake in the retracted position via said corresponding string and actuated to the extended position via an internal spring and further wherein at a temperature below a predetermined melting temperature of the corresponding string, the corresponding string maintains the at least one marker in the retracted position, and when at a temperature equal to or higher than the predetermined melting temperature of the corresponding string, the corresponding string melts to permit release of the at least one marker into the extended position, and once the corresponding string melts, the internal spring actuates the at least one marker into the extended position for visual indication.

8. The thermal indicator device of claim 7 comprising five markers and five corresponding strings, wherein each of the five markers are labeled as either rare, medium rare, medium, medium well, or well-done.

9. The thermal indicator device of claim 8, wherein each of the five markers is retained within the hollow stake in the retracted position via its corresponding string.

10. The thermal indicator device of claim 8, wherein each of the five corresponding strings comprises a different melting temperature.

* * * * *